Patented Sept. 29, 1953

2,653,921

UNITED STATES PATENT OFFICE 2,653,921

CATALYSTS FOR THE HARDENING OF ARTIFICIAL RESINS AND THEIR USE IN THE TEXTILE INDUSTRY

Georg Sulzer, Basel, Switzerland, assignor to Ciba Limited, Basel, Switzerland, a Swiss firm No Drawing. Application July 10, 1950, Serial No. 173,006. In Switzerland July 25, 1949

16 Claims. (Cl. 260—67.6)

This invention relates to new and improved catalysts for the hardening of artificial resins and their use in the textile industry.

As is known the hardening of artificial resins is of considerable importance, especially in the textile industry, where the hardening of artificial resins on i. e. in or upon fibers, fiber materials, and the like has found a very wide application. Thus for example by hardening of artificial resins, especially thermosetting aminoplasts, on the fiber, inter alia creaseproof or antishrink effects, are produced. For the hardening as a rule acid catalysts are used. As such the ammonium salts of strong acids have proved of especial advantage. Treatment baths which contain the hardenable aminoplasts together with such catalysts are however unstable since they have the tendency to become acid so that premature separation of condensation products may take place. Attempts have been made to counteract this disadvantage by addition of excess of ammonia. Unless large quantities of ammonia are used, however, it becomes, after a time, fixed by the formaldehyde of the aminoplast and is thereby rendered ineffective.

A further disadvantage, which has not yet been satisfactorily overcome, of the application of artificial resin finishing baths containing ammonium salt, consists in that in it the fastness to light of many dyeings is detrimentally affected to such an extent that many important dyestuffs normally fast to light cannot be used for the dyeing of textiles which are intended to be subjected to such an artificial resin treatment.

The present invention is based on the observation that as catalysts for the hardening of artificial resins, such as thermosetting aminoplasts, there are excellently suitable the products which are produced in concentrated aqueous solution by the action on boric acid of water-soluble salts of strong acids with such metals of the first and second group of the periodic system, the atomic weights of which do not exceed 138 and which metals yield salts the aqueous solutions of which are colorless. It has in particular been ascertained according to this invention that, whereas in dilute aqueous solution boric acid and such salts apparently show no reaction, in concentrated aqueous solution they cause a surprising decrease of the pH value. For instance, in case of the addition of 12 grams boric acid to a solution of 12 grams calcium chloride in 1 liter water, no considerable decrease of the pH value of about 6.5 occurs. If, however, 12 grams boric acid are added to an aqueous solution of 12 grams calcium chloride of 50 per cent. strength by weight, the pH value sinks surprisingly to a pH value of about 2. Similar phenomena, but as a rule not so markedly, occur on addition of boric acid to other salts of the above defined group, such as strontium chloride, barium chloride, calcium nitrate, zinc chloride, zinc nitrate, zinc sulfate, magnesium chloride, magnesium sulfate, lithium chloride, sodium chloride and potassium chloride.

In view of these circumstances treatment baths including thermosetting aminoplasts can thus contain such salts and boric acid in suitable dilution without the slightest effect upon their stability. However, when textiles are treated with such solutions, dried and hardened, the drying process passes through a phase in which the boric acid and the salts concerned become present in concentrated solution. At this moment the impregnated material on the fiber becomes acid and indeed under such conditions as are favorable for the hardening of the artificial resin. By the action of heat, for example drying at elevated temperature, the hardening of the artificial resin is completed. According to the quantity and the type of the artificial resin brought on to the fiber in this manner and to the nature of the process of application, various effects are obtained, for example crease-resistance, resistance to swelling, resistance to shrinkage, increase of the wet tearing strength or permanent chintz or embossed effects. Other effects can also be achieved, for example the fixing on the fiber in a manner fast to washing, of dyestuffs and pigments, finishing agents and the like.

The application of the new catalysts possesses in addition the advantage that in the treatment of dyed textiles in most cases only an inconsiderable detrimental effect or even none at all, is exerted upon the fastness to light. This advantage is shown particularly clearly in the application of urea-formaldehyde resins. However, also in the case of the application of melamine-formaldehyde resins the improvement is clearly recognizable.

As mentioned in the introduction the present process is of especial value for the hardening of aminoplasts. As hardenable aminoplasts are concerned condensation products of aldehydes, especially of formaldehyde, with compounds such as urea, thiourea or aminotriazines such as melamine or benzoguanamine or with mixtures of such compounds.

As starting materials for the production of the catalysts which are formed during the drying and the hardening process, there are concerned, together with boric acid, salts of strong acids such as mentioned and defined hereinbefore. In this connection, mention is made that by the expression strong acids there are understood such acids which are at least as strong as formic acid. Such acids have therefore a dissociation constant of at least $2.1 \times 10^{-4}$; such acids, besides formic acid, are for instance malic acid, glyoxalic acid or tartaric acid. By the expression strong acids, however, there are particularly understood acids the dissociation constant of which is at least $1 \times 10^{-3}$, such as fumaric acid, monochloracetic acid, as well as inorganic acids, such as sulfuric acid, nitric acid or hydrochloric acid.

On evaporation of the dilute aqueous solutions containing boric acid and the salts as well as by the addition of boric acid to concentrated solutions of the salts or in the preparation of concentrated aqueous solutions directly from mixtures of boric acid with such salts, the formation of the catalysts take place, probably by a process corresponding to that which is described by Hans Meerwein in Liebigs Annalen der Chemie, vol. 455, pages 227–253 (1927).

The catalysts of the present invention can also find application outside the textile industry, for example in the manufacture of stiffeners for foot-wear, artificial resin glues and in many cases in which artificial resins are required to be hardened in or upon fiber materials, such as yarns, fabrics, paper, wood or the like.

The catalysts of the present invention are new and, as set forth above, have an enlarged field of application.

The following examples illustrate the invention:

*Example 1*

Staple fiber fabric is impregnated on the foulard with a solution which contains per liter together with 60 grams of an about 75 per cent. by weight aqueous solution of methylol melamine methyl ether, also 12 grams of calcium chloride (practically water-free) and 12 grams of boric acid. The bath catalyzed in this manner exhibits an excellent stability.

The fabric impregnated in the bath is squeezed out on the foulard until an increase of its weight to about 70–100 per cent. (calculated on the dry weight of the untreated fabric). The fabric is then dried on a frame apparatus and thereupon hardened for 5 minutes at 140° C.

The staple fiber fabric thus treated exhibits an average shrinkage on washing of 5 per cent., whereas the untreated fabric in the same washing process shrinks by 12 per cent.

A similar effect is obtained when in the above example instead of the methylol melamine methyl ether 50 grams of dimethylol urea are employed.

Useful results are likewise obtained with smaller quantities of catalyst, for example with 6 grams of calcium chloride and 6 grams of boric acid per liter.

*Example 2*

An aqueous solution is prepared which contains per liter 160 grams of dimethylolurea and in addition, as catalyst, 6 grams of zinc chloride (practically water-free) and 6 grams of boric acid.

The treatment of staple fiber or cotton takes place in a similar manner to that described in Example 1.

The angle of crease of the staple fiber fabric rises owing to this treatment from 97° to 140° (measured by means of the apparatus recommended by the Shirley Institute).

To the treating bath, which possesses an excellent stability, a suitable plasticizer can be added.

*Example 3*

A staple fiber fabric is impregnated on the foulard with an aqueous bath which contains per liter 160 grams of dimethylol urea, 12 grams of calcium chloride and 12 grams of boric acid and further treated as described in Example 1. After drying and hardening it requires a very good crease resistance.

*Example 4*

An aqueous bath is employed which contains per liter 120 grams of dimethylol melamine, 12 grams of calcium chloride, 12 grams of boric acid and as plasticizer 1 gram of the acetate of the condensation product of stearic acid N-methylolamide with triethanolamine. Staple fiber or cotton fabric is impregnated with this solution on the foulard and subsequently dried, possesses after hardening a very good crease-resistance.

In this example the plasticizer can be replaced with similar result by other plasticizers as for example by a mixture of the sodium salt of $\mu$-heptadecyl-N-benzyl-benzimidazole disulfonic acid with the sodium salt of the semi-ester of phthalic acid and oleic acid ethanolamide.

*Example 5*

A staple fiber fabric, impregnated with a solution which contains per liter 60 grams of an about 75 per cent. by weight aqueous solution of methylol melamine methyl ether, 14.7 grams of calcium chloride and 6.2 grams of boric acid, after squeezing, drying and hardening at 140° C. for 5 minutes, exhibits the following improvements compared with untreated fabric:

|  | Shrinkage on washing | | | Water absorption (Swelling value) |
| --- | --- | --- | --- | --- |
|  | Warp | Weft | Average |  |
| Untreated | *Percent* 11.5 | *Percent* 11.0 | *Percent* 11.25 | *Percent* 100 |
| Treated | 4.5 | 5.0 | 4.75 | 50 |

Similar improvements are achieved when instead of calcium chloride for example lithium chloride or magnesium chloride is employed.

*Example 6*

Viscose satin is printed with a printing color which is composed of the following ingredients and is of good stability:

100 parts by weight of titanium white,
   200 parts by weight of a 50 per cent. by weight aqueous solution of a condensation product of limited water solubility from 1 mol of melamine and 3 mols of formaldehyde,
   350 parts by weight of a 6 per cent. by weight aqueous solution of tragacanth which has been neutralized with sodium hydroxide,
   240 parts by weight of a 5 per cent. by weight aqueous boric acid solution,
   40 parts by weight of a 30 per cent. by weight calcium chloride solution, and
   70 parts by weight of water Total 1,000 parts by weight.

The printed fabric is dried, steamed for 8 minutes in the Mather-Platt and given a cold rinse.

The matt white print thus produced is of very good resistance to a soap wash at 50–60° C.

Example 7

40 parts by weight of a hydrophobic melamine-formaldehyde condensation product, of which a hydrochloric acid solution containing 10 per cent by weight of the resin fails to yield a precipitate in the vicinity of a pH value of 3, which melamine-formaldehyde condensation product is the same as mentioned in Example 6, are dissolved hot in 120 parts by weight of water. This solution is added to a bath which contains, dissolved in 880 parts by weight of water, 7.5 parts by weight of calcium chloride (practically water-free) and 7.5 parts by weight of boric acid and also 0.5 part by weight of an aqueous solution of 12.5 per cent strength by weight of the product obtained by the reaction of 20 mols of ethylene oxide on 1 mol of olein alcohol. An emulsion of the artificial resin is formed.

Staple fiber fabric is impregnated on the foulard with this emulsion, squeezed out so that the increase in weight is 90–100 per cent (calculated on the dry weight of the untreated fabric), stretched to its original size, dried and then heated for 10 minutes at 140° C.

The fabric thus treated shrinks by 4.5 per cent (average of shrinkage of warp and weft) on washing for ½ hour at 50° C. with an aqueous bath containing 5 grams soap and 0.5 gram sodium carbonate per liter, whereas the untreated fabric shows a shrinkage of 12.6 per cent.

Example 8

Staple fiber fabric is impregnated with an aqueous solution which contains per liter 60 grams of an aqueous about 75 per cent strength solution of a methylol melamine methyl ether, further 9.4 grams of sodium chloride and 6.2 grams of boric acid; the fabric is then squeezed out and dried as indicated in Example 7 and hardened for 5 minutes at 140° C.

The fabric thus treated possesses a swelling value of 65.5 per cent, whereas the untreated fabric shows a swelling value of 100 per cent.

By the expression swelling value there is to be understood the water absorption capacity of the fiber. A method for the determination of this water absorption capacity is described in "Melliands Textilberichte," volume XXIII, page 242 (1942).

Example 9

A keir-boiled and bleached cotton fabric, which if desired may be dyed or printed and which is to be well singed in order to remove the loose fiber fluff, is impregnated with a solution which contains per liter 80–100 grams of the methylol melamine methyl ether solution mentioned in Example 8, 10–12.5 grams of calcium chloride (practically water-free) and 10–12.5 grams of boric acid. The impregnated fabric is squeezed out as described in Example 7 and dried at temperatures of maximal 50° C. Immediately after the drying, the fabric is slightly sprayed with water and thereupon glossed in a weakly moistened state on a friction calandre, for instance by a pressure of 10 tons and a 25 per cent friction at 130° C. After a sufficiently high gloss has been reached, hardening is effected by curing, preferably for 5–10 minutes at 120–150° C.

The thus produced chintz-effect possesses a good resistance to water and fastness to washing.

What I claim is:

1. In a process of hardening acid curable thermosetting aminoplasts at elevated temperatures with the aid of catalysts, the step of effecting the hardening in the presence of a catalyst produced in concentrated aqueous solution by the action upon boric acid of a water-soluble salt of a strong, at most dibasic, acid, having a dissociation constant of at least $2.1 \times 10^{-4}$, with a metal selected from the class consisting of the metals of the first and second groups of the periodic system, the atomic weight does not exceed 138 and which metal yields salts the aqueous solutions of which are colorless.

2. In a process of hardening acid-curable thermosetting aminoplasts on textile fiber materials at elevated temperatures with the aid of catalysts, the step of effecting the hardening on the textile fiber material in the presence of a catalyst produced in concentrated aqueous solution by the action upon boric acid of a water-soluble salt of a strong, at most dibasic, acid, having a dissociation constant of at least $2.1 \times 10^{-4}$, with a metal selected from the class consisting of the metals of the first and second groups of the periodic system, the atomic weight of which does not exceed 138 and which metal yields salts the aqueous solutions of which are colorless.

3. In a process of hardening acid-curable thermosetting aminoplasts on textile fiber materials at elevated temperatures with the aid of catalysts, the step of effecting the hardening on the textile fiber material in the presence of a catalyst produced in concentrated aqueous solution by the action upon boric acid of a water-soluble salt of a strong, at most dibasic, acid, having a dissociation constant of at least $2.1 \times 10^{-4}$, with a metal of the second group of the periodic system, the atomic weight of which does not exceed 138 and which metal yields salts the aqueous solutions of which are colorless.

4. In a process of hardening acid-curable thermosetting aminoplasts on textile fiber materials at elevated temperatures with the aid of catalysts, the step of effecting the hardening on the textile fiber material in the presence of a catalyst produced in concentrated aqueous solution by the action upon boric acid of a water-soluble salt of a strong, at most dibasic, acid, having a dissociation constant of at least $2.1 \times 10^{-4}$, with an earth alkali metal of the second group of the periodic system, the atomic weight of which is higher than 20 and does not exceed 138 and which metal yields salts the aqueous solutions of which are colorless.

5. In a process of hardening acid-curable thermosetting aminoplasts on textile fiber materials at elevated temperatures with the aid of catalysts, the step of effecting the hardening on the textile fiber material in the presence of a catalyst produced in concentrated aqueous solution by the action upon boric acid of a water-soluble salt of a strong, at most dibasic, acid, having a dissociation constant of at least $1 \times 10^{-3}$, with a metal selected from the class consisting of the metals of the first and second groups of the periodic system, the atomic weight of which does not exceed 138 and which metal yields salts the aqueous solutions of which are colorless.

6. In a process of hardening acid-curable thermosetting aminoplasts on textile fiber materials at elevated temperatures with the aid of catalysts, the step of effecting the hardening on the textile fiber material in the presence of a catalyst produced in concentrated aqueous solution by the action upon boric acid of a water-soluble salt of a strong, at most dibasic, acid, having a dissociation constant of at least $1 \times 10^{-3}$, with a metal of the second group of the periodic system, the atomic weight of which does not exceed 138 and which metal yields salts the aqueous solutions of which are colorless.

7. In a process of hardening acid-curable thermosetting aminoplasts on textile fiber materials at elevated temperatures with the aid of catalysts, the step of effecting the hardening on the textile fiber material in the presence of a catalyst produced in concentrated aqueous solution by the action upon boric acid of a water-soluble salt of a strong, at most dibasic, acid, having a dissociation constant of at least $1 \times 10^{-3}$, with an alkaline earth metal of the second group of the periodic system, the atomic weight of which is higher than 20 and does not exceed 138 and which metal yields salts the aqueous solutions of which are colorless.

8. In a process of hardening acid-curable thermosetting aminoplasts on textile fiber materials at elevated temperatures with the aid of catalysts, the step of effecting the hardening on the textile fiber material in the presence of a catalyst produced in concentrated aqueous solution by the action of calcium chloride upon boric acid.

9. Acid-curable thermosetting aminoplasts hardened with the aid of a catalyst produced in concentrated aqueous solution by the action upon boric acid of a water-soluble salt of a strong, at most dibasic, acid, having a dissociation constant of at least $2.1 \times 10^{-4}$, with a metal selected from the class consisting of the metals of the first and second groups of the periodic system, the atomic weight of which does not exceed 138 and which metal yields salts the aqueous solutions of which are colorless.

10. Cellulosic fiber materials on which are located acid-curable thermosetting aminoplasts hardened with the aid of a catalyst produced in concentrated aqueous solution by the action upon boric acid of a water-soluble salt of a strong, at most dibasic, acid, having a dissociation constant of at least $2.1 \times 10^{-4}$, with a metal selected from the class consisting of the metals of the first and second groups of the periodic system, the atomic weight of which does not exceed 138 and which metal yields salts the aqueous solutions of which are colorless.

11. Cellulosic fiber materials on which are located acid-curable thermosetting aminoplasts hardened with the aid of a catalyst produced in concentrated aqueous solution by the action upon boric acid of a water-soluble salt of a strong, at most dibasic, acid, having a dissociation constant of at least $2.1 \times 10^{-4}$, with a metal of the second group of the periodic system, the atomic weight of which does not exceed 138 and which metal yields salts the aqueous solutions of which are colorless.

12. Cellulosic fiber materials on which are located acid-curable thermosetting aminoplasts hardened with the aid of a catalyst produced in concentrated aqueous solution by the action upon boric acid of a water-soluble salt of a strong, at most dibasic, acid, having a dissociation constant of at least $2.1 \times 10^{-4}$, with an alkaline earth metal of the second group of the periodic system, the atomic weight of which is higher than 20 and does not exceed 138 and which metal yields salts the aqueous solutions of which are colorless.

13. Cellulosic fiber materials on which are located acid-curable thermosetting aminoplasts hardened with the aid of a catalyst produced in concentrated aqueous solution by the action upon boric acid of a water-soluble salt of a strong, at most dibasic, acid, having a dissociation constant of at least $1 \times 10^{-3}$, with a metal selected from the class consisting of the metals of the first and second groups of the periodic system, the atomic weight of which does not exceed 138 and which metal yields salts the aqueous solutions of which are colorless.

14. Cellulosic fiber materials on which are located acid-curable thermosetting aminoplasts hardened with the aid of a catalyst produced in concentrated aqueous solution by the action upon boric acid of a water-soluble salt of a strong, at most dibasic, acid, having a dissociation constant at least $1 \times 10^{-3}$, with a metal of the second group of the periodic system, the atomic weight of which does not exceed 138 and which metal yields salts the aqueous solutions of which are colorless.

15. Cellulosic fiber materials on which are located acid-curable thermosetting aminoplasts hardened with the aid of a catalyst produced in concentrated aqueous solution by the action upon boric acid of a water-soluble salt of a strong, at most dibasic, acid, having a dissociation constant of at least $1 \times 10^{-3}$, with an alkaline earth metal of the second group of the periodic system, the atomic weight of which is higher than 20 and does not exceed 138 and which metal yield salts the aqueous solutions of which are colorless.

16. Cellulosic fiber materials on which are located acid-curable thermosetting aminoplasts hardened with the aid of a catalyst in concentrated aqueous solution by the action of calcium chloride upon boric acid.

GEORG SULZER.

References Cited in the file of this patent

UNITED STATES PATENTS

| Number | Name | Date |
|---|---|---|
| 1,338,709 | Sulzberger | May 4, 1920 |
| 1,964,039 | Dreyfus | June 26, 1934 |
| 2,377,744 | Bailey | June 5, 1945 |
| 2,399,489 | Landes | Apr. 30, 1946 |
| 2,415,564 | Radford | Feb. 11, 1947 |